United States Patent

Suzuoki et al.

[11] Patent Number: 5,805,135
[45] Date of Patent: Sep. 8, 1998

[54] APPARATUS AND METHOD FOR PRODUCING PICTURE DATA BASED ON TWO-DIMENSIONAL AND THREE DIMENSIONAL PICTURE DATA PRODUCING INSTRUCTIONS

[75] Inventors: Masakazu Suzuoki, Tokyo; Makoto Furuhashi, Kanagawa, both of Japan

[73] Assignee: Sony Corporation, Tokyo, Japan

[21] Appl. No.: 885,287

[22] Filed: Jun. 30, 1997

Related U.S. Application Data

[63] Continuation of Ser. No. 269,076, Jun. 30, 1994, abandoned.

[30] Foreign Application Priority Data

Jul. 2, 1993 [JP] Japan ..................................... 5-190763

[51] Int. Cl.$^6$ ........................................................ G09G 5/36
[52] U.S. Cl. ............................................ 345/139; 345/113
[58] Field of Search .................................... 345/139, 113, 345/114, 119, 120, 112, 115, 116, 118, 133, 419, 421, 422

[56] References Cited

U.S. PATENT DOCUMENTS

| | | | |
|---|---|---|---|
| 4,509,043 | 4/1985 | Mossaides | 345/113 |
| 4,559,533 | 12/1985 | Bass et al. | 345/120 |
| 4,689,616 | 8/1987 | Goude et al. | 345/113 |
| 4,951,229 | 8/1990 | DiNicola et al. | 345/113 |
| 5,254,979 | 10/1993 | Trevett et al. | 345/113 |
| 5,343,395 | 8/1994 | Watts | 345/139 |
| 5,509,663 | 4/1996 | Otake et al. | 345/113 |

FOREIGN PATENT DOCUMENTS

| | | |
|---|---|---|
| 0 100 097 | 2/1984 | European Pat. Off. . |
| 0 232 004 | 8/1987 | European Pat. Off. . |

*Primary Examiner*—Regina Liang
*Attorney, Agent, or Firm*—Frommer Lawrence & Haug LLP; William S. Frommer; Dennis M. Smid

[57] ABSTRACT

Methods and apparatus are provided for producing image data representing a picture from first two-dimensional image data producing instructions for producing two-dimensional image data and three-dimensional image data producing instructions for producing three-dimensional image data. Two-dimensional image data producing instructions are derived from the three-dimensional image data producing instructions. Display data producing priorities are assigned to the various two-dimensional image data producing instructions. Image data are produced by executing the various two-dimensional image data producing instructions in an order corresponding to the assigned image data producing priorities. The image data include a plurality of pixels each having a corresponding picture location and the pixels are stored in a memory such that first pixels produced after second pixels having the same corresponding picture locations overwrite the second pixels.

30 Claims, 7 Drawing Sheets

| 0 | 0 | 0 | 1 | 1 | 0 | 0 | 0 |
|---|---|---|---|---|---|---|---|
| 0 | 0 | 1 | 1 | 1 | 1 | 0 | 0 |
| 0 | 1 | 1 | 1 | 2 | 2 | 1 | 0 |
| 1 | 1 | 1 | 2 | 3 | 2 | 1 | 1 |
| 1 | 1 | 2 | 3 | 3 | 2 | 1 | 1 |
| 0 | 1 | 2 | 2 | 2 | 2 | 1 | 0 |
| 0 | 0 | 1 | 1 | 1 | 1 | 0 | 0 |
| 0 | 0 | 0 | 1 | 1 | 0 | 0 | 0 |

FIG. 11

COLOR NUMBER INDEX

| | R | G | B |
|---|---|---|---|
| 0 | $r_1$ | $g_1$ | $b_1$ |
| 1 | $r_2$ | $g_2$ | $b_2$ |
| 2 | $r_3$ | $g_3$ | $b_3$ |
| : | : | : | : |
| : | : | : | : |
| : | : | : | : |
| : | : | : | : |

CLUT

FIG. 12

APPARATUS AND METHOD FOR PRODUCING PICTURE DATA BASED ON TWO-DIMENSIONAL AND THREE DIMENSIONAL PICTURE DATA PRODUCING INSTRUCTIONS

This application is a continuation of application Ser. No. 08/269,076, filed Jun. 30, 1994, now abandoned.

BACKGROUND OF THE INVENTION

The present invention relates to apparatus and methods for producing picture data capable of producing realistic images simulating three-dimensional physical effects. The invention is particularly useful for producing such picture data in computer graphics applications wherein hardware resources are limited, for example, in the case of video game apparatus and computer graphic apparatus.

In certain conventional video game apparatus, two-dimensional picture data are mapped to a rectangular picture area (referred to herein as a "sprite"). In such apparatus, the sprites are combined like the tiles of a mosaic on a display screen to produce an image. Such video game apparatus are referred to as two-dimensional or "2D" systems. In such 2D systems, images can only be produced as combinations of two-dimensional images produced from sprite patterns which have been stored in advance and which must be displayed as images lying in a fixed plane.

Other conventional apparatus include three-dimensional or "3D" graphic systems such as computer graphic apparatus for producing an image on a two-dimensional screen of a display in such a manner that the image simulates three-dimensional effects. In such 3D systems, the surface of a 3D object to be represented is separated into a plurality of polygonal surfaces having various arbitrary shapes. Picture data representing the polygonal areas of the 3D object are successively stored in a frame memory having memory locations corresponding to positions on a display screen to accumulate picture data which, when supplied to the display, reconstruct an image which appears to be three-dimensional.

In such 3D systems the data representing each of the polygonal surfaces must be transformed in order to represent three-dimensional effects such as rotation of the object they represent. This function would be very difficult to realize in a 2D system since it would be necessary to carry out complex address calculations to map texture data to each transformed polygonal surface.

2D systems achieve image movement by rearranging sprite patterns within a plane representing the display screen, which is a relatively easy function to implement. However, such a function would be very difficult to carry out in a 3D system for the following reasons.

Conventional 3D systems do not assemble data for a display screen as an aggregate of sprites. To produce a 3D image from an aggregate of sprites by effecting a modification to such a 3D system, it would be necessary to map a texture pattern stored in a texture pattern area of a memory (such as a video memory or frame buffer) to a three-dimensionally transformed polygonal surface. It will be appreciated that the picture data producing or "drawing" instructions consequently would be complicated.

In 3D systems the image data for the various polygonal surfaces are produced in succession based on data indicating the depth of each polygonal surface from the plane of the display screen. If it were desired to represent an arbitrary shape on a background using data arranged as sprites, it would be necessary to represent the overlapped portions of the background as transparent. Conventional 3D systems produce image data representing the polygonal surfaces of an object such that surfaces which cannot be seen from the point of view when displayed are produced first and stored in a display memory and the remaining data representing the polygonal surfaces are successively produced in order according to their depth from the screen. Consequently, image data representing a polygonal surface at the front of the object cover over the image data of reverse surfaces which previously were produced and stored. It is necessary, therefore, to include data indicating the depth of each polygonal surface (referred to as "Z data") and the order in which the data representing the polygons are produced is determined by reference to such Z data.

In the conventional 3D systems a Z buffer is provided to store the Z data in pixel units and the stored Z data are compared to determine a display preference. While it may appear promising to determine which sprites will be transparent by means of comparing the stored Z data, since the Z data are required for each pixel, the Z buffer must have a very large capacity.

In order to produce image data representing an arbitrarily shaped area (such as a circular area), this is carried out by means of a masking function which renders image data transparent on a pixel-by-pixel basis. To carry this function out, masking data, termed an "a plane", are required in addition to texture image data representing image features to be mapped to a predefined surface. In order to display a sprite in an overlapping relationship with a polygonal surface produced by a 3D system, such mask data are required in order to mask the portion of the polygonal area overlapped by the sprite.

In prior art systems which utilize a sprite function in a conventional 3D system, a memory having a large capacity and a number of circuits for use exclusively in producing the 3D data are required. It will be appreciated that such a system is extraordinarily large and complex as compared with a 2D system.

It has also been proposed in the prior art to implement a system wherein 2D image data would be produced by means of a conventional 2D system and three-dimensional image data would be produced by means of a conventional 3D system independently of the 2D system. The 2D image data and the 3D image data which have been produced independently would then be added upon conversion into a video signal to be supplied to a video display device.

A drawback of such a system is that circuitry, including separate frame memories, are required for producing the 2D image data and the 3D image data. Moreover, it is difficult to mix separately produced polygonal image data and sprite image data in order to produce a combined image.

OBJECTS AND SUMMARY OF THE INVENTION

It is an object of the present invention to provide methods and apparatus which overcome the above disadvantages and shortcomings of the prior art.

It is a further object of the present invention to provide methods and apparatus for producing picture data employing features of both 2D systems and 3D systems by means of a common picture data producing apparatus and employing a common image memory.

It is a further object of the present invention to provide apparatus and methods for producing picture data which employ relatively simple and inexpensive hardware and which nevertheless produce picture data which may be used to provide realistic display images.

In accordance with a first aspect of the present invention, a method is provided for producing image data representing a picture from first two-dimensional image data producing instructions for producing two-dimensional image data and three-dimensional image data producing instructions for producing three-dimensional image data. The method comprises the steps of: producing second two-dimensional image data producing instructions based on the three-dimensional image data producing instructions; assigning image data producing priorities to the first and second two-dimensional image data producing instructions; producing image data by executing the first and second two-dimensional image data producing instructions in an order corresponding to the assigned image data producing priorities, the image data including a plurality of pixels each having a corresponding image location; and storing the plurality of pixels of the produced image data in a memory such that first pixels produced after second pixels having corresponding image locations overwrite the second pixels.

In accordance with another aspect of the present invention, an apparatus for producing image data representing a picture from first two-dimensional image data producing instructions for producing two-dimensional image data and three-dimensional image data producing instructions for producing three-dimensional image data, comprises: means for producing second two-dimensional image data producing instructions based on the three-dimensional image data producing instructions; means for assigning image data producing priorities to the first and second two-dimensional image data producing instructions; means for producing image data by executing the first and second two-dimensional image data producing instructions in an order corresponding to the assigned image data producing priorities, the image data including a plurality of pixels each having a corresponding image location; and memory means for storing the plurality of pixels of the produced image data in a memory such that first pixels produced after second pixels having corresponding image locations overwrite the second pixels.

In accordance with a further aspect of the present invention, a circuit for producing image data representing an image from first two-dimensional image data producing instructions for producing two-dimensional image data and three-dimensional image data producing instructions for producing three-dimensional image data, comprises: a main bus; input means coupled with the main bus for receiving the first two-dimensional image data producing instructions and the three-dimensional image data producing instructions and providing the received instructions to the main bus; a main memory coupled with the main bus and operative to receive therefrom, store and read out the first two-dimensional image data producing instructions and the three-dimensional image data producing instructions; means coupled with the main bus to receive the three-dimensional image data producing instructions for producing second two-dimensional image data producing instructions therefrom; sorting means for assigning display data producing priorities to the first and second two-dimensional image data producing instructions and including respective priority data therewith, the sorting means being coupled with the main bus to supply the first and second two-dimensional image data producing instructions and their respective priority data to the main memory for storage therein; image data producing means for producing image data representing an image to be displayed by carrying out the first and second two-dimensional image data producing instructions, the image data producing means being coupled with the main bus; a memory controller for transferring the first and second two-dimensional image data producing instructions according to their respective priority data to the image data producing means via the main bus; and frame memory means for storing the image data produced by the image data producing means.

In accordance with yet another aspect of the present invention, a game playing apparatus for producing game image data representing a game image based on first two-dimensional image data producing instructions for producing two-dimensional image data and three-dimensional image data producing instructions for producing three-dimensional image data is provided. The game playing apparatus comprises: a game user input means for receiving game operation commands produced in response to an action by a user; conversion means for converting the three-dimensional image data producing instructions to modified three-dimensional image data producing instructions for producing image data representing a modified image based upon the game operation commands and for converting the modified three-dimensional image data producing instructions to converted two-dimensional image data producing instructions for producing two-dimensional data representing the modified image; sorting means for assigning image data producing priorities to the two-dimensional image data producing instructions and the converted two-dimensional image data producing instructions; image data producing means for producing the game image data by carrying out the two-dimensional image data producing instructions and the converted two-dimensional image data producing instructions in an order corresponding to the assigned image data producing priorities, the game image data including a plurality of pixels each having a corresponding image location; and memory means for storing the plurality of pixels of the produced game image data such that first pixels produced after second pixels having the same corresponding image locations overwrite the second pixels, the memory means being operative to output the stored pixels for producing the game image.

It will be seen that the methods and apparatus in accordance with the present invention implement the functions of a 2D system as well as those of a 3D system by means of a common apparatus which requires the use of only a single image memory. Consequently, efficient use of the required hardware is achieved. Moreover, the image data producing functions of a 3D system and the sprite image data producing function of a 2D system are integrated by means of the method and apparatus of the present invention simply by assigning priorities to the respective image data producing instructions so that the functions of the 3D system and those of the 2D system are easily implemented and image data for producing display images with numerous variations can be obtained easily and inexpensively.

The above, and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

DETAILED DESCRIPTION OF CERTAIN ADVANTAGEOUS EMBODIMENTS

Figure 1:
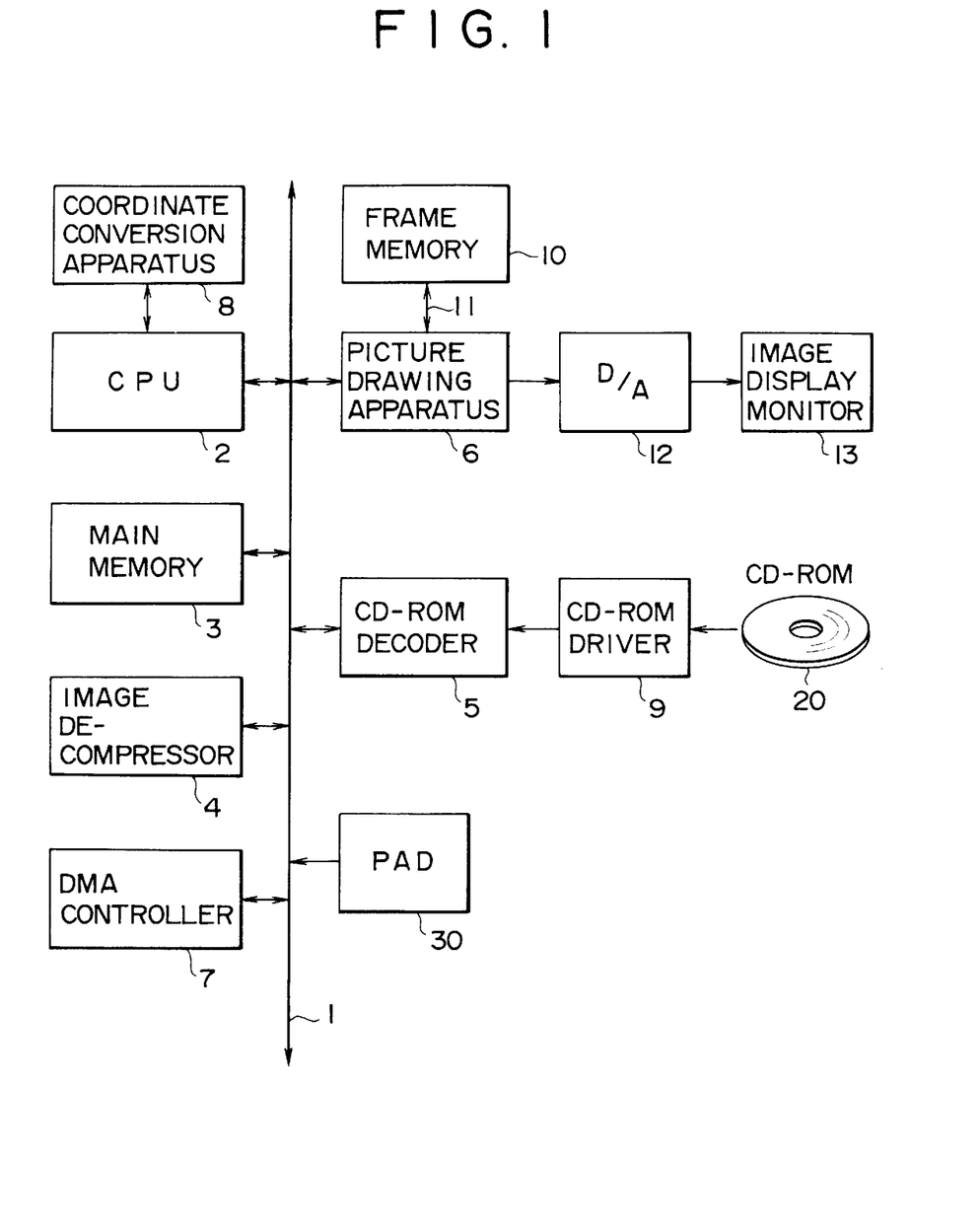
FIG. 1 is a block diagram of a game playing apparatus in accordance with an embodiment of the present invention.

With reference first to FIG. 1, a block diagram of a game playing apparatus in accordance with an embodiment of the present invention is illustrated therein. As seen in FIG. 1, a system bus 1 is coupled with a central processing unit (CPU) 2, as well as to a main memory 3, an image data decompressor 4, a CD-ROM decoder 5, an image data producing apparatus 6, a direct memory access (DMA) controller 7 and a user command input device 30.

The CD-ROM decoder 5 is coupled with a CD-ROM driver 9 which serves to read data from a CD-ROM 20 loaded in the CD-ROM driver 9. The data read from the CD-ROM 20 includes an application program having two-dimensional image data producing instructions such as sprite picture drawing instructions as well as three-dimensional image data producing instructions such as polygonal surface image data producing instructions (sometimes referred to herein as "polygon producing instructions"). The data read from the CD-ROM 20 also includes texture image data such as still image data and moving picture image data to be mapped on a sprite or polygonal image surface. In addition, data representing a color conversion table (CLUT) are read from the CD-ROM 20 by the CD-ROM driver 9. The data read from the CD-ROM 20 are supplied by the CD-ROM driver 9 to the CD-ROM decoder 5 which decodes the read-out data and supplies the decoded data to the system bus 1.

The two- and three-dimensional image data producing instructions are transferred from the CD-ROM decoder 5 to the main memory 3 for storage therein by the DMA controller 7.

The user command input device 30 may be, for example, a keyboard or joystick-type input device, or any other suitable means for translating actions of a game user into commands which may be recognized by the game playing apparatus. The CPU 2 (which may be, for example, a 32 bit CPU) receives game operation commands from the user command input device 30 and determines the motion of an object or objects within the image to be produced, or a shift of the viewpoint of such image in response to the commands input with the use of the device 30. The CPU 2 also obtains the three-dimensional image data producing instructions from the main memory 3 and provides the same to a coordinate conversion apparatus 8 coupled by a pipeline connection to the CPU 2. In further embodiments, the coordinate conversion apparatus is connected directly to the main bus 1.

Based on the determinations of object motion and/or changes in viewpoint as determined by the CPU 2, the coordinate conversion apparatus 8 carries out three-dimensional coordinate conversion of the three-dimensional image data producing instructions to reflect the consequent translation and rotation of the three-dimensional images to be produced by means of these instructions. The apparatus 8 also converts the three-dimensional image data producing instructions as thus modified into converted two-dimensional image data producing instructions for producing two-dimensional image data. The CPU 2 produces polygon producing instruction strings based on the above-mentioned determinations of object motion and viewpoint shifts. The instructions are stored in the main memory 3.

As mentioned above, texture data are also read from the CD-ROM 20 and decoded by the CD-ROM decoder 5. Where the texture data is moving picture data, it is typically recorded in compressed form on the CD-ROM 20, for example, by discrete cosine transformation (DCT). The decoded texture data is supplied by the CD-ROM decoder 5 to the main bus 1 from which the decoded texture data are obtained by the main memory 3 and stored therein. Subsequently, the compressed texture data are supplied via the main bus 1 to the image decompressor 4 which carries out inverse discrete cosine transformation of the compressed texture data to produce decompressed texture data.

The image data producing apparatus 6 is connected to a frame memory 10 by way of a local bus 11. The frame memory 10 includes two frame memories, each of which has a picture drawing memory area. At any given time, one frame memory is used to produce and store image data while image data is read from the second frame memory to produce a display image. The roles of the respective frame memories are switched at each vertical interval.

The frame memory 10 has a texture area for storing texture data which are transferred thereto either from the main memory 3 or from the image data decompressor 4 after decompression, if need be, to be stored for use in producing the image data. Also, the frame memory 10 stores the color conversion table data CLUT in a color look-up table after the data are transferred from the CD-ROM decoder 5 to the frame memory 10 by the DMA controller 7.

The image data are output from the frame memory 10 by the image data producing apparatus 6 to a D/A converter 12 to be converted to analog form for display by an image display monitor 13.

The two-dimensional image data producing instructions and the converted two-dimensional image data producing instructions (that is, those produced by converting the three-dimensional image data producing instructions in the coordinate conversion apparatus 8) are transferred by the DMA controller 7 to the image data producing apparatus 6 in an order determined according to a sorting operation carried out by the CPU 2, as described below. The apparatus 6 executes the instructions as received from the main memory 3 and writes display data produced with the use of these instructions into the picture drawing area of that one of the frame memories currently used to produce image data.

The image data producing apparatus 6 is provided with a slope calculation unit (not shown for purposes of simplicity and clarity) which serves to carry out a slope determination for the purpose of converting data to be mapped onto a polygonal image surface produced with the use of the instructions received from the main memory 3. The data to be mapped onto the polygonal image surface, as well as that which may be mapped onto a sprite area, may be either texture data or data representing light shading (in which case the polygonal image surface or sprite is filled with brightness values).

Figure 2:
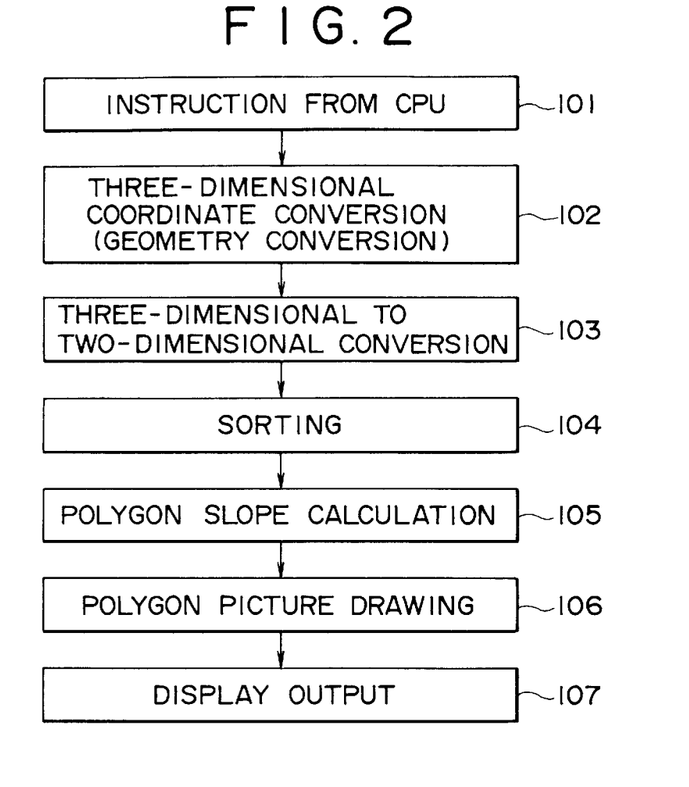
FIG. 2 is a flow chart for use in illustrating a process of producing polygon surface image data with the use of the embodiment of FIG. 1.

With reference also to FIG. 2, a flow chart is provided therein for illustrating the operation of producing two-dimensional image data of a polygonal image surface based on a three-dimensional image data producing instruction. In a step 101, the CPU 2 transfers an instruction stored in the main memory 3 to the coordinate conversion apparatus 8 by way of the system bus 1. Based on commands input by a user with the use of the device 30, the coordinate conversion apparatus 8 in a step 102 carries out three-dimensional coordinate conversion of a polygon producing instruction to effect appropriate rotation and translation of a corresponding three-dimensional object to be depicted with the use of data produced by the polygon producing instruction. The instruction as thus modified is then converted to a two-dimensional image data producing instruction in a step 103. When the three-dimensional instructions have been thus converted, they are sorted by the CPU 2 by a process described below as indicated by the step 104 and transferred to the main memory 3 for storage therein by way of the system bus 1.

As indicated above, the instructions as sorted by the CPU 2 are transferred in sequence from the main memory 3 to the image data producing apparatus 6 by the DMA controller 7 via the system bus 1. Once the instructions have been carried out, as mentioned above, the above-described slope determination is performed by the image data producing apparatus 6, as indicated by a step 105, and texture or brightness data is mapped to the produced polygonal surfaces in order to "draw" polygonal image surface data and store the same in the frame memory, as indicated by step 106. Subsequently, in a step 107 once all of the image data, including polygonal image surface data, have been thus produced and stored, after the next vertical interval the data are output to produce a display.

Figure 3:
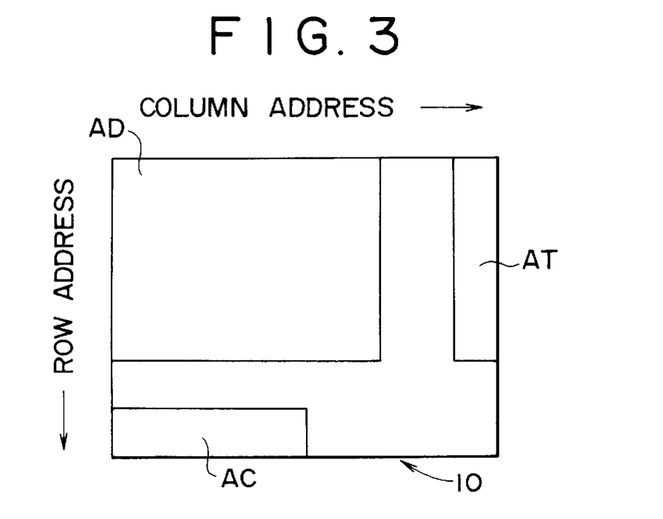
FIG. 3 is a schematic diagram illustrating a memory space of a frame memory of the FIG. 1 embodiment.

As mentioned above, the frame memory 10 has a texture area for storing texture data and a picture drawing area for storing image data as a frame of an image is produced. With reference now to FIG. 3, a memory space of the frame memory 10 is illustrated schematically wherein memory locations are arranged according to column and row addresses so that the data are stored according to two-dimensional data addresses. The memory space of the frame memory 10 includes a two-dimensional address texture area AT for storing the texture data. A number of different kinds of texture patterns can be stored in the area AT. Reference AD designates the picture drawing area of the memory space, as mentioned above. Finally, reference character AC designates a memory area in which the color conversion table CLUT is stored.

Figure 4A:
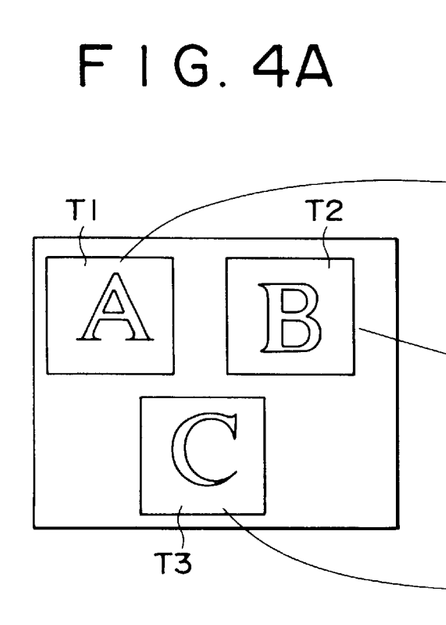
FIGS. 4A through 4C illustrate a technique for mapping texture data onto polygonal surface image areas.
Figure 4B:
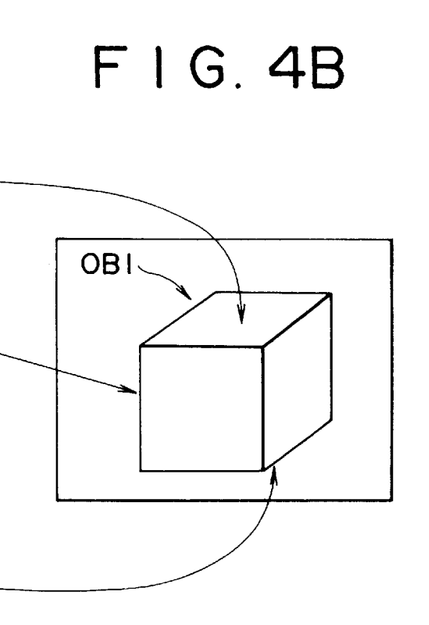
Figure 4C:
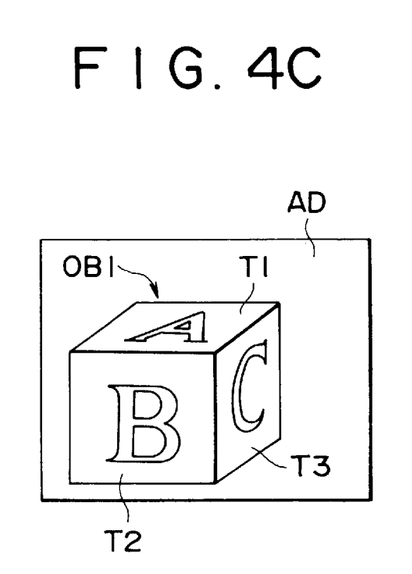

With reference now to FIGS. 4A through 4C, a technique for mapping texture data to polygonal image surfaces is illustrated therein. Referring to FIG. 4A, texture data patterns T1, T2 and T3 stored in the texture data area AT are subjected to two-dimensional mapping conversion to map the texture data onto a respective polygonal image surface defining a corresponding face of an object OB1 as illustrated in FIG. 4B. Once the mapping conversion has been carried out, each of the converted texture patterns T1, T2 and T3 is stored in the picture drawing area AD to conform to its respective polygonal image surface on the object OB1 as illustrated in FIG. 4C. Subsequently, the data are read out from the area AD to produce an image display.

As noted above, the texture data may take the form of still picture data or moving picture data. In the case of still picture data, its texture data is transferred from the main memory 3 to the texture area AT of the frame memory 10 by way of the image data producing apparatus 6. The apparatus 6 maps the texture data to a selected polygonal image surface in accordance with a received instruction so that as a consequence, the still picture data serves to produce an image on the surface of an object corresponding to the polygonal area.

In the case of moving picture texture data, the data as compressed is read from the CD-ROM 20, decoded by the CD-ROM decoder 5 and stored in the main memory 3. Then, the compressed data are supplied to the image data decompressor 4 where the data are decompressed, and the decompressed moving picture data are later stored in the texture area AT of the frame memory 10. The texture pattern itself in the texture area AT can be rewritten for each frame so that the image data mapped to corresponding polygonal image surfaces are automatically updated. In this manner, moving pictures can be mapped onto the surface of an object as displayed.

Images having three-dimensional characteristics can be produced by means of a two-dimensional display by successively producing and storing image data of polygonal image surfaces representing object surfaces in order from those which are represented by their Z data as farthest from the display screen to those which are closest. In contrast to the Z buffer method in which Z data are stored for each pixel in memory, the present embodiment determines the order in which polygonal image surface data are produced and stored in the following manner.

Figure 5A:
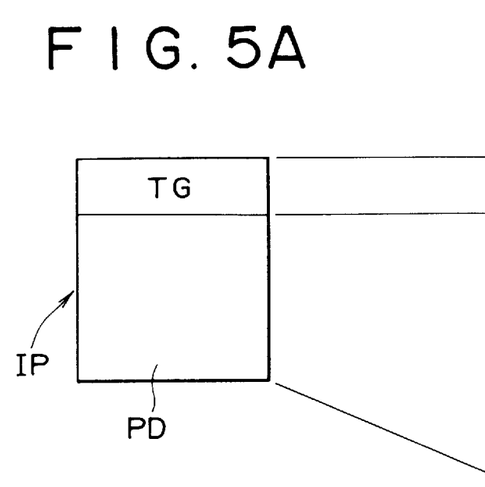
FIGS. 5A and 5B illustrate the structure of a polygon producing instruction as employed in the embodiment of FIG. 1.
Figure 5B:
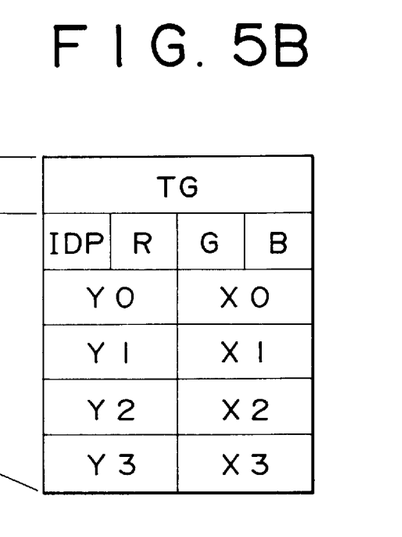

More particularly, as illustrated in FIG. 5A each polygon producing instruction IP, in accordance with the presently described embodiment of the invention, includes a tag TG in addition to drawing data PD. The tag TG of a given instruction IP represents the address in the main memory 3 at which a next instruction to be carried out is stored. The picture drawing data PD includes identification data IDP indicating that the instruction IP is a polygon producing instruction, coordinate data (X0, Y0), (X1, Y1), (X2, Y2) and (X3, Y3) for example, if the polygonal surface is bounded by a quadrilateral figure, and color data (R, G, B) when the polygonal surface is to be mapped with data representing one color.

As described above, the CPU 2 assembles various instructions to compose a polygon producing instruction string for producing the image data of a corresponding picture. Thereafter, the CPU 2 rewrites the tags of the instruction string to effect sorting in accordance with Z data for each instruction which serves to establish priority for display among polygonal image surface data which have the same or overlapping image positions.

Figure 6:
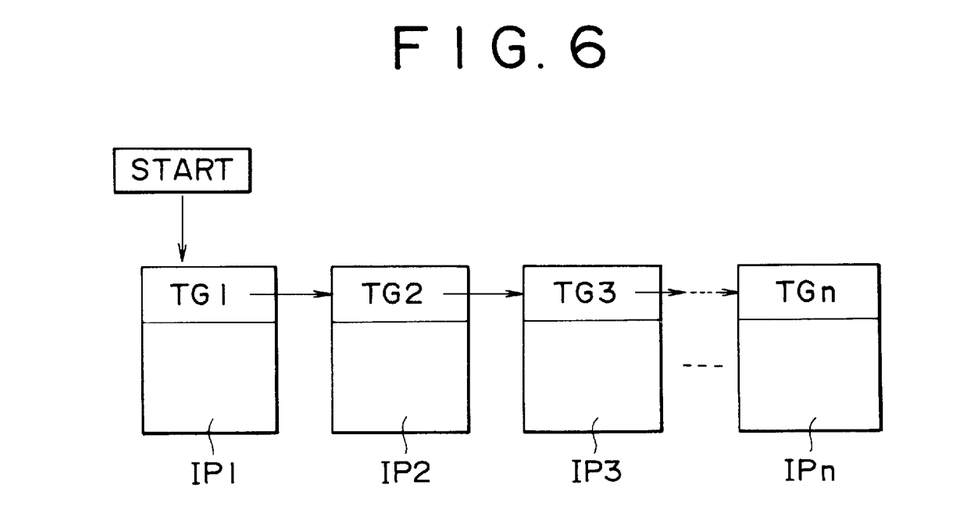
FIG. 6 schematically illustrates a manner in which the polygon producing instructions of FIGS. 5A and 5B are executed in succession according to tags included therewith.

Once these operations are completed, the DMA controller 7 transfers the instructions of the string in succession according to their tags to the image data producing apparatus 6. With reference to FIG. 6, if a first one of the instructions transmitted to the apparatus 6 is identified as IP1 having a tag TG1, the next transmitted instruction, identified as IP2, is that stored at the memory location of main memory 3 indicated by TG1. In the same manner, instructions IP3, IP4, . . . are transmitted in succession to the apparatus 6 which produces picture data in accordance with each instruction and stores the picture data in the order as so produced in the picture drawing area AD of the frame memory 10. In this manner, pixel data so produced by the apparatus 6 corresponding in position within a given frame to previously produced and stored pixel data overwrites the previously stored pixel data.

As noted above the frame memory 10 includes two frame buffers, one of which at a given time is used to assemble a frame of a picture as described above while a frame previously stored in the other frame buffer is read out via the D/A converter 12 to the monitor 13 for producing a corresponding picture display. After a new frame has been assembled in the first frame buffer as described above, the data in the first buffer is read out to produce a display of a new frame while yet another frame is assembled in the second buffer. This process is repeated over and over, typically 30 to 60 times per second, in order to produce a display of a moving picture.

As noted above, two-dimensional picture drawing instructions serve to produce sprites, rectangular picture data areas which are seen to be within the plane of the picture or parallel thereto. In the present embodiment sprites are produced as rectangular areas of standard dimensions to which texture image data of the same size and shape are mapped. The sprite data drawing or producing instructions may, therefore, be simplified as compared with the polygon producing instructions.

Figure 7:
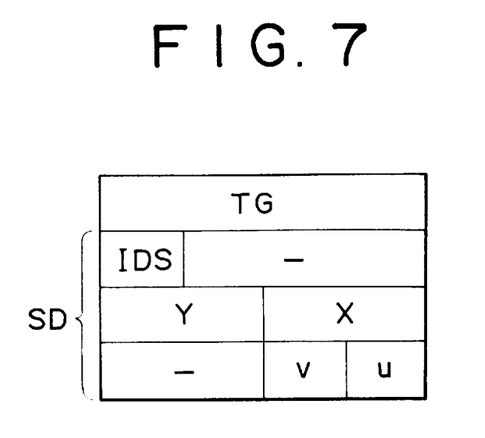
FIG. 7 illustrates the data structure of a sprite image data producing instruction.

More specifically, and with reference to FIG. 7, a sprite picture drawing instruction as illustrated therein according to the presently described embodiment of the invention includes a tag TG like that of the polygon producing instructions. The sprite drawing instruction also includes sprite picture drawing data SD comprising identification data IDS identifying the instruction as a sprite drawing instruction, coordinate data (X,Y) of a point Ps in the picture drawing area AD of the frame memory 10, and coordinate data (u, v) identifying a position within the texture data space AT of the frame memory 10.

Figure 8:
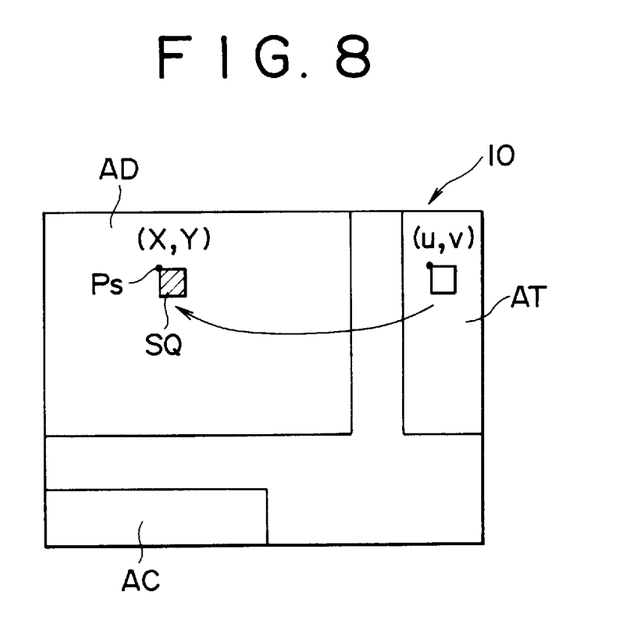
FIG. 8 schematically illustrate a process of mapping texture image data stored in a texture area of the frame memory of the FIG. 1 embodiment onto a sprite image area in a picture drawing area of the frame memory.

As illustrated by FIG. 8, the sprite picture data drawing instruction of FIG. 7 instructs that picture data be produced for a rectangular picture area which is eight pixels high by eight pixels wide and is located within the picture drawing area AD of the frame memory 10 such that its upper left corner coincides with the point Ps, a point corresponding with a point on the screen of the display screen of the monitor 13 (or whatever device is used to produce a display of the picture). The image content of the eight-by-eight pixel region identified by coordinates (u, v) is specified as the image data within an eight-by-eight pixel region within the texture data space AT of the frame memory 10 beginning at the coordinates (u, v). It is noted that the texture data space AT in memory 10 is arranged as a plurality of pages or sheets each including 256 by 256 pixels. Accordingly, the coordinates (u, v) do not specify an address within the texture data space AT, but rather a rectangular array of pixels (8×8) within a respective page thereof.

Figure 9:
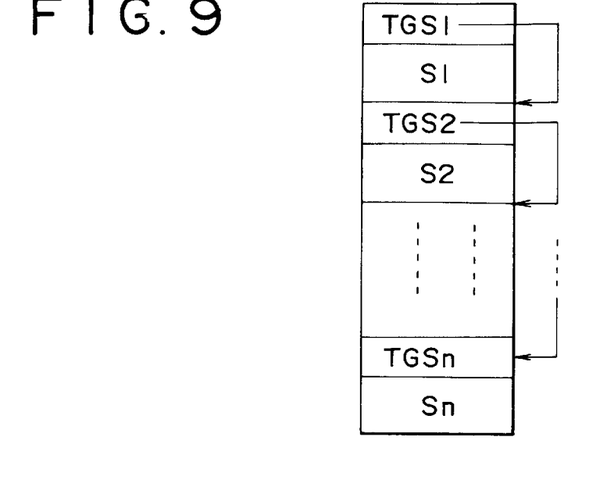
FIG. 9 schematically illustrates a sprite producing instruction string.

Referring now to FIG. 9, a sprite picture drawing instruction string can be formed to achieve a picture drawing function similar to the sprite function of a 2D system, but which is also quite similar to the polygon producing instruction strings described hereinabove, in the following manner. Each of a plurality of sprite picture drawing instructions as illustrated schematically in FIG. 9 includes sprite picture drawing data S1 through Sn and a respective tag TGS1 through TGSn each of which, like the tags used in the case of the polygon producing instructions indicates the location in memory of the next sprite picture drawing instruction of the string.

Figure 10A:
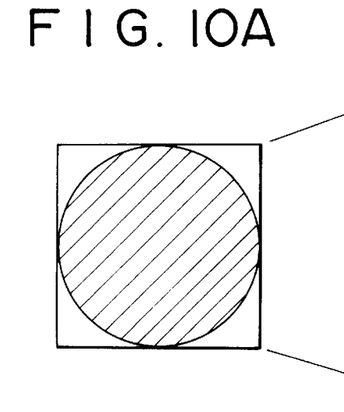
FIGS. 10A and 10B illustrate a technique for producing an arbitrarily selected shape with the use of a sprite producing instruction.

Although each sprite picture drawing instruction produces image data for a rectangular picture area of predetermined dimensions, it is nevertheless possible to represent an object or figure having an arbitrarily selected shape by including transparency as a selectible "color" for the texture data of the sprite. FIG. 10A provides an illustration of the manner in which a circular object can be depicted by a sprite by assigning a color code (in this example "0") to transparency and assigning this code to those portions of the sprite which are not included within the circular figure so that image data which otherwise would be overwritten by the transparent portions of the sprite is nevertheless retained in the frame memory 10.

Figure 11:
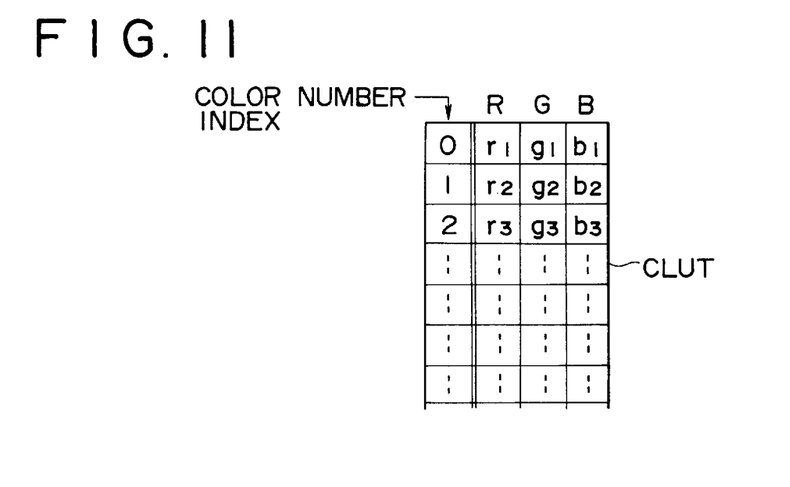
FIG. 11 is a color conversion table to which reference is made in describing the technique of FIGS. 10A and 10B.

An exemplary color conversion table CLUT stored in the main memory 3 is illustrated in FIG. 11 wherein a color code or number index is assigned to each possible combination of red (R), green (G) and blue (B) color components to be assigned to a given pixel. In this example, the color number index "0" signifies transparency, that is, that the background is to be displayed as is despite the overlapping portion of the sprite which has been color coded for transparency. Typically a color code which is seldom used (for example, black) is selected to represent transparency.

Figure 10B:
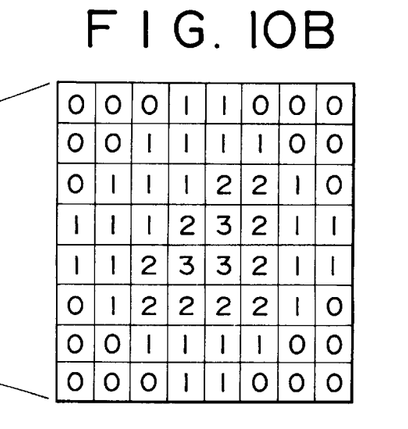

Referring to FIG. 10B, color codes from the table of FIG. 11 are assigned to each of the 64 pixels of the sprite image area of FIG. 10A in order to depict the desired circular figure. As will be seen from FIG. 10B, the pixels in the corner regions of the sprite have been assigned transparency codes so that image data written previously in the frame memory 10 at corresponding locations are retained due to the transparency codes of those particular sprite pixels. Accordingly, a wide range of arbitrarily selected images may be depicted in this manner even though the dimensions of each sprite are fixed.

It will be appreciated that sprite picture drawing instructions are relatively uncomplicated since texture image data is readily mapped to the sprite image areas of predetermined dimensions. It is relatively easy, therefore, to implement the display of an animated or other moving picture by means of the sprite function. As an example, in this manner an animation may be displayed in an overlapping relationship with an actually photographed moving picture.

Figure 12:
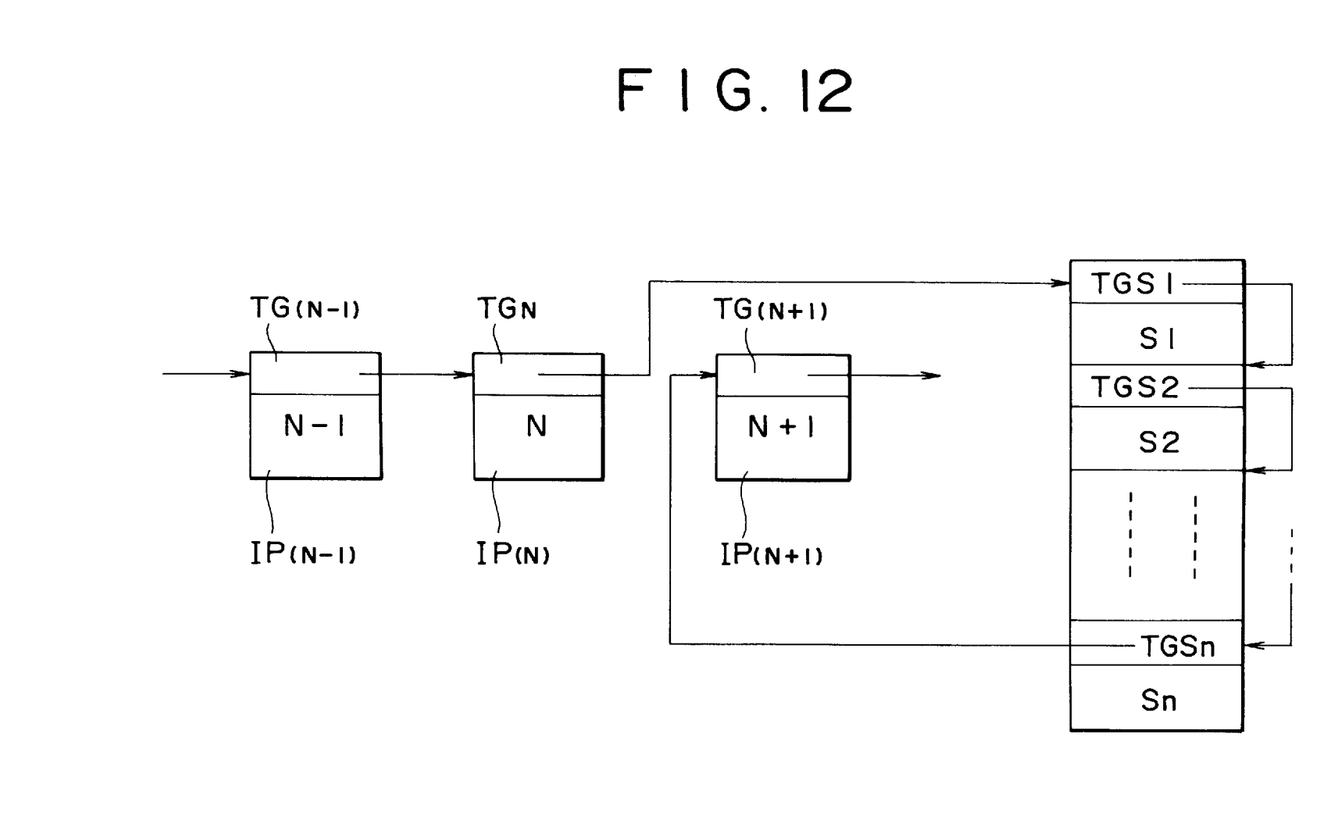
FIG. 12 schematically illustrates a technique for inserting a sprite producing instruction string in a polygon producing instruction string in order to produce image data by freely mixing polygon producing instructions and sprite producing instructions.

As noted above, the data and list construction of the sprite picture drawing instruction string are similar to those of the polygon area picture drawing instruction string. Consequently, a sprite drawing instruction string can be inserted freely into a polygonal picture drawing instruction string utilizing the tags of the sprite picture drawing instructions. As an example, and with reference to FIG. 12, a polygonal area picture drawing instruction string includes instructions N−1, N, N+1, . . . , while a sprite picture drawing instruction string includes instructions S1, S2 . . . Sn which have been prepared separately from the polygon instruction string. The sprite instruction string may be readily inserted into the polygon instruction string, for example, between instructions N and N+1 in FIG. 12 by rewriting the tag $TG_N$ of the polygon instruction N to identify the location in the memory 3 at which the first sprite instruction S1 of the sprite instruction string is stored. Also, the tag TGSn of the last instruction of the sprite instruction string is rewritten to specify the location in memory 3 where the polygon instruction N+1 is stored. Consequently, the picture data drawing apparatus 6 will carry out the sprite instruction string after the polygon instruction N and thereafter continue carrying out the polygon instruction string with the polygon instruction N+1.

It will be seen from the foregoing that polygon drawing instructions and sprite drawing instructions may be freely mixed in this fashion, so that programming for producing a desired picture utilizing both sprite drawing instructions and polygon producing instructions is greatly facilitated.

In the embodiments described hereinabove, instructions and image data were obtained by the apparatus from a CD-ROM. However, other recording media may be employed for this purpose such as, for example, magnetic disks and semiconductor memories (such as memory cards), and other sources for such instructions and data may be employed.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for producing image data representing a picture, comprising the steps of:
    obtaining first sprite producing instructions representative of two-dimensional image data, in which each of said first sprite producing instructions includes a sprite data portion and a sprite tag portion representative of an address location;
    obtaining polygonal producing instructions representative of three-dimensional image data, in which each of said polygonal producing instructions includes a polygonal data portion and a polygonal tag portion representative of an address location which is similar to a respective sprite tag portion;
    producing second sprite producing instructions based on the polygonal producing instructions;
    obtaining Z-data corresponding to depths of respective surfaces and performing a Z-sorting operation by utilizing said Z-data for assigning image data producing priorities so as to determine a data production order for the first and second sprite producing instructions;
    producing image data by executing the first and second sprite producing instructions in said data production order corresponding to the assigned image data producing priorities, the image data including a plurality of pixels each having a corresponding image location; and
    storing the plurality of pixels of the produced image data in a memory such that first pixels produced after second pixels having corresponding image locations overwrite the second pixels.

2. The method of claim 1, wherein the step of producing image data comprises executing the first and second sprite producing instructions by means of a common image producing apparatus.

3. The method of claim 2, further comprising the step of storing the first and second sprite producing instruction at respective addresses in a memory, the step of assigning image data producing priorities comprises providing each of the first and second sprite producing instructions with address data indicating a corresponding memory address of a next one of the instructions to be executed, and the step of producing image data comprises transferring the instructions to the common image producing apparatus in an order determined by the address data provided with the instructions.

4. The method of claim 1, wherein the data production order corresponds to the relative depth of surfaces represented by the produced image data.

5. The method of claim 1, further comprising the step of modifying the polygonal producing instructions in accordance with at least one of movement of an image to be produced with the use of the polygonal producing instructions and a change in a point of view of the image to be produced.

6. The method of claim 5, wherein the step of modifying the polygonal producing instructions comprises determining at least one of said movement of said image and said change in said point of view based on a command produced with the use of a game input device.

7. The method of claim 1, wherein the step of producing image data comprises generating image surfaces and mapping image texture data to the generated image surfaces to produce said pixels.

8. The method of claim 7, further comprising the step of reading the sprite and polygonal producing instructions from a memory, reading compressed texture data from the memory and decompressing the compressed texture data to produce the image texture data.

9. The method of claim 8, wherein the memory is a CD-ROM.

10. The method of claim 1, further comprising the steps of forming a sprite producing instruction string from a number of said sprite producing instructions, forming a polygonal producing instruction string from a number of said polygonal producing instructions, and inserting one of said sprite producing instruction string and said polygonal instruction string into the other of said sprite producing instruction string and said polygonal instruction string at a desired location thereof.

11. An apparatus for producing image data representing a picture, said apparatus comprising: means for obtaining first sprite producing instructions representative of two-dimensional image data, in which each of said first sprite producing instructions includes a sprite data portion and a sprite tag portion representative of an address location;
    means for obtaining polygonal producing instructions representative of three-dimensional image data, in which each of said polygonal producing instructions includes a polygonal data portion and a polygonal tag portion representative of an address location which is similar to a respective sprite tag portion;
    means for producing second sprite producing instructions based on the polygonal producing instructions;
    means for obtaining Z-data corresponding to depths of respective surfaces and performing a Z-sorting operation by utilizing said Z-data for assigning image data producing priorities so as to determine a data production order for the first and second sprite producing instructions;
    image data producing means for producing image data by executing the first and second sprite producing instructions in said data production order corresponding to the assigned image data producing priorities, the image data including a plurality of pixels each having a corresponding image location; and first memory means for storing the plurality of pixels of the produced image data such that first pixels produced after second pixels having corresponding image locations overwrite the second pixels.

12. The apparatus of claim 11, wherein the image data producing means comprises a common image producing apparatus for executing the first and second sprite producing instructions.

13. The apparatus of claim 12, further comprising second memory means for storing the first and second sprite producing instructions, wherein the priority assigning means is operative to provide each of the first and second sprite producing instructions with address data indicating a corresponding address in the second memory means of a next one of the instructions to be executed, the apparatus further comprising means for transferring the instructions stored in the second memory means to the common image producing apparatus in an order determined by the address data provided with the instructions.

14. The apparatus of claim 13, wherein the data production order corresponds to the relative depth of surfaces represented by the produced image data.

15. The apparatus of claim 11, further comprising modifying means for modifying the polygonal producing instructions in accordance with at least one of movement of an image to be produced with the use of the polygonal producing instructions and a change in a point of view of the image to be produced.

16. The apparatus of claim 15, wherein the modifying means is operative to determine at least one of said movement of said image and said change in said point of view based on a command produced with the use of a game input device.

17. The apparatus of claim 11, wherein the image data producing means is operative to generate image surfaces and to map image texture data to the generated image surfaces to produce said pixels.

18. The apparatus of claim 17, wherein the first memory means includes first and second frame buffers and is operative during a first vertical interval of the image data to store pixels successively produced by the image data producing means and simultaneously read previously produced pixels from the second frame buffer for producing a display image, and is operative during a successive vertical interval of the image data to write data produced by the image data producing means in the second frame buffer and simultaneously read previously produced pixels from the first frame buffer for producing a second picture display.

19. The apparatus of claim 17, wherein the image data producing means is operative to produce data representing rectangular image areas parallel to a plane of the picture by executing the first sprite producing instructions.

20. The apparatus of claim 19, wherein the first memory means is operative to store the image texture data for use by the image data producing means.

21. The apparatus of claim 19, wherein the first memory means is operative to store a color conversion table including a code representing transparency and to read data from the color conversion table to the image data producing means, and wherein the image producing means is operative to utilize data from said color conversion table to assign colors to pixels within said rectangular image areas and in response to said code representing transparency to refrain from overwriting pixel data in corresponding locations previously stored in the first memory means.

22. The apparatus of claim 11, further comprising means for forming a sprite producing instruction string from a number of said sprite producing instructions, for forming a polygonal producing instruction string from a number of said polygonal producing instructions, and for inserting one of said sprite producing instruction string and said polygonal instruction string into the other of said sprite producing instruction string and said polygonal instruction string at a desired location thereof.

23. A circuit for producing image data representing an image, said circuit comprising:

a main bus;

input means coupled with the main bus for receiving first sprite producing instructions representative of two-dimensional image data and polygonal producing instructions representative of three-dimensional image data and providing the received instructions to the main bus, in which each of said first sprite producing instructions includes a sprite data portion and a sprite tag portion representative of an address location and in which each of said polygonal producing instructions includes a polygonal data portion and a polygonal tag portion representative of an address location which is similar to a respective sprite tag portion;

a main memory coupled with the main bus and operative to receive therefrom, store and read out the first sprite producing instructions and the polygonal producing instructions;

means coupled with the main bus to receive the polygonal producing instructions for producing second sprite producing instructions therefrom;

sorting means for obtaining Z-data corresponding to depths of respective surfaces and performing a Z-sorting operation by utilizing said Z-data for assigning display data producing priorities so as to determine a data production order for the first and second sprite producing instructions and including respective priority data therewith, the sorting means being coupled with the main bus to supply the first and second sprite producing instructions and their respective priority data to the main memory for storage therein;

image data producing means for producing image data representing an image to be displayed by carrying out the first and second sprite producing instructions in said data production order, the image data producing means being coupled with the main bus;

a memory controller for transferring the first and second sprite producing instructions in accordance with said data production order to the image data producing means via the main bus; and frame memory means for storing the image data produced by the image data producing means.

24. The circuit of claim 23, wherein the input means is operative to receive compressed image texture data and to supply the compressed image texture data to the main bus, the main memory being operative to receive from the main bus, store and read out the compressed image texture data, the circuit further comprising an image data decompressor coupled with the main bus to receive the compressed image texture data read out from the main memory, the image decompressor being operative to decompress the compressed image texture data and supply decompressed image texture data to the main bus, the frame memory means being operative to store the decompressed image texture data in a texture area thereof, the image data producing means being operative to produce the image data utilizing the decompressed image texture data stored in the frame memory means.

25. The circuit of claim 24, wherein the input means comprises a decoder having an input to receive the compressed image texture data, the sprite producing instructions and the polygonal producing instructions in encoded form and operative to decode the received encoded compressed image texture data, sprite producing instructions and polygonal producing instructions.

26. The circuit of claim 25 wherein the decoder comprises a CD-ROM decoder, and wherein the input means further comprises a CD-ROM drive for reading the encoded compressed image texture data, sprite producing instructions and polygonal producing instructions therefrom and to supply the same to the CD-ROM decoder.

27. The circuit of claim 23, further comprising means for forming a sprite producing instruction string from a number of said sprite producing instructions, for forming a polygonal producing instruction string from a number of said polygonal producing instructions, and for inserting one of said sprite producing instruction string and said polygonal instruction string into the other of said sprite producing instruction string and said polygonal instruction string at a desired location thereof.

28. A game playing apparatus for producing game image data representing a game image, said apparatus comprising:

game user input means for receiving game operation commands produced in response to an action by a user;

means for obtaining first sprite producing instructions representative of two-dimensional image data, in which each of said first sprite producing instructions includes a sprite data portion and a sprite tag portion representative of an address location;

means for obtaining polygonal producing instructions representative of three-dimensional image data, in which each of said Polygonal producing instructions includes a polygonal data portion and a polygonal tag portion representative of an address location which is similar to a respective sprite tag portion;

conversion means for converting the polygonal producing instructions to modified polygonal producing instructions for producing image data representing a modified image based upon the game operation commands and for converting the modified polygonal producing instructions to converted sprite producing instructions for producing two-dimensional data representing the modified image;

sorting means for obtaining Z-data corresponding to depths of respective surfaces and performing a Z-sorting operation by utilizing said Z-data for assigning image data producing priorities so as to determine a data production order for the sprite producing instructions and the converted sprite producing instructions;

image data producing means for producing the game image data by carrying out the sprite producing instructions and the converted sprite producing instructions in said data production order corresponding to the assigned image data producing priorities, the game image data including a plurality of pixels each having a corresponding image location; and memory means for storing the plurality of pixels of the produced game image data such that first pixels produced after second pixels having the same corresponding image locations overwrite the second pixels, the memory means being operative to output the stored pixels for producing the game image.

29. The game playing apparatus of claim 28, further comprising an A/D converter for converting the pixels output by the memory means to analog form.

30. The game playing apparatus of claim 28, further comprising means for forming a sprite producing instruction string from a number of said sprite producing instructions, for forming a polygonal producing instruction string from a number of said polygonal producing instructions, and for inserting one of said sprite producing instruction string and said polygonal instruction string into the other of said sprite producing instruction string and said polygonal instruction string at a desired location thereof.

* * * * *